(12) United States Patent
Eriksson et al.

(10) Patent No.: US 6,463,069 B1
(45) Date of Patent: Oct. 8, 2002

(54) ARRANGEMENT AND METHOD RELATING TO A TELECOMMUNICATIONS SYSTEM HANDLING REDUNDANT SIGNALS

(75) Inventors: Anders Eriksson, Tumba; Ulf Hansson, Huddinge; Johnny Larsson, Farsta, all of (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/214,046

(22) PCT Filed: Jun. 25, 1997

(86) PCT No.: PCT/SE97/01136

§ 371 (c)(1),
(2), (4) Date: Dec. 23, 1998

(87) PCT Pub. No.: WO97/50189

PCT Pub. Date: Dec. 31, 1997

(30) Foreign Application Priority Data

Jun. 25, 1996 (SE) ................................................ 9602493

(51) Int. Cl.$^7$ .............................................. H04L 12/54
(52) U.S. Cl. ..................... 370/428; 370/412; 370/429; 370/516; 370/519; 375/373
(58) Field of Search ................................. 370/428, 429, 370/412, 516, 517, 518, 519; 375/372, 373

(56) References Cited

U.S. PATENT DOCUMENTS

| | | | |
|---|---|---|---|
| 4,511,859 A | 4/1985 | Dombrowski | 331/11 |
| 5,680,389 A | * 10/1997 | Douglas et al. | 370/228 |
| 5,777,987 A | * 7/1998 | Adams et al. | 370/336 |
| 6,032,180 A | * 2/2000 | Nishikawa | 370/394 |
| 6,092,128 A | * 7/2000 | Maas et al. | 710/57 |
| 6,188,697 B1 | * 2/2001 | Umehira et al. | 370/412 |

FOREIGN PATENT DOCUMENTS

| | | |
|---|---|---|
| EP | 0265 080 | 4/1988 |
| WO | WO93/16535 | 8/1993 |

* cited by examiner

*Primary Examiner*—Hassan Kizou
*Assistant Examiner*—Saba Tsegate
(74) *Attorney, Agent, or Firm*—Burns, Doane, Swecker & Mathis, L.L.P.

(57) ABSTRACT

A buffering technique handles dynamic and static phase deviations between signals from at least two redundant planes. Dynamic phase deviations between planes are handled in a first buffer and static phase deviations between planes are handled in a second buffer. A register arrangement is provided in which is stored information relating to a first difference between read and write pointers for a plane of the second buffer, and information relating to the current difference between the read and write pointers of the same plane in the static buffer is stored after a reload operation. The first and current differences are compared to provide a control signal which is used for the next reload operation in the dynamic buffer which is controlled by the control signal to avoid end of buffer in the second buffer if the difference between the first and the current differences exceeds a given number of positions.

27 Claims, 6 Drawing Sheets

ARRANGEMENT AND METHOD RELATING TO A TELECOMMUNICATIONS SYSTEM HANDLING REDUNDANT SIGNALS

TECHNICAL FIELD

The present invention relates to an arrangement for handling redundant signals in the form of data from at least two planes wherein a buffering arrangement receives a number of unsynchronized data streams from a number of different planes with each a clock system wherein buffering means are provided for handling dynamic phase deviations between the planes and for handling static phase deviations between the planes.

The invention also relates to a method for handling redundant signals in the form of a number of unsynchronized data streams from a number of different planes in a buffering arrangement wherein dynamic phase deviations between the planes and static phase deviations between the planes are handled.

Still further the invention relates to a telecommunication system comprising an arrangement of the above mentioned kind.

TECHNIC STATE OF THE ART

In transmission systems or communication systems such as e.g. telecommunication systems the amount of information transmitted is often very high and protection is applied in different ways to reduce the risks of information being lost and to reduce the risk of faulty transmission of information.

Since in communication systems information or data is often transported as signals at high speeds and the signals often also carry large amounts of data it is of great importance that such signals can be protected in an efficient way. In telecommunication systems the signals may carry a high number of telephone calls, e.g. 2000 calls or similar and it is obvious that such signals must have a high availability.

In various known systems are e.g. switching matrixes or cross-connects multiplicated. In some known systems the switching matrixes are triplicated whereas in other systems they are duplicated.

Triplication is often applied because in that way fault isolation is facilitated since majority vote can be taken in the terminating unit as user of the signal. In the terminating unit the three incoming data streams are converted into one. Particularly if the system is a high speed system the triplication causes problems, namely that it is difficult to keep the planes synchronized since data arrive asynchronously from three different planes. Often it is also desirable to be able to use long cables. Therefore the phase relations between the clock systems of the planes are not known in the clock exchange buffers in the terminating unit. In a known system the buffering arrangement is divided into first buffering means for handling the dynamic phase deviations and second buffering means for compensating for static differences or delays resulting from different cable lengths. If one of the planes is faulty or for some reason has to be taken down, the write pointer of the dynamic buffer for e.g. the master plane is copied to the dynamic buffer of a slave plane, i.e. here the plane that was taken down, to be able to restart the slave plane. However, there is a one clock cycle uncertainty when the dynamic buffer reloads one of its internal write pointers from a selected master which means that the delay through the dynamic buffer can change when a reload operation is performed. This delay is compensated for in the static buffer and for a number of consecutive reload operations, the static buffer may be forced to one of its end positions which means that the triplicated system may have to be taken down due to end of buffer for all three planes which is clearly disadvantageous.

In today known systems these problems have been dealt with through using cables having substantially the same length or through lowering the clock frequency which however do not provide satisfactory solutions since it is desirable both to be able to use long cables and to have a clock frequency which is as high as possible to meet the demands of efficient, particularly high speed, systems.

SUMMARY OF THE INVENTION

What is needed is therefore an arrangement which receives redundant signals intended for a terminal or terminating unit as a user of the signal through which a high clock frequency can be applied and through which it is particularly possible to use long cables. Particularly an arrangement is needed through which it is possible to keep a number (n) of planes synchronized wherein n at least is two. Particularly an arrangement is needed through which the multiplication, e.g. particularly triplication protection principle of signals can be further taken advantage of without suffering from drawbacks such has having to lower the frequencies or apply too severe restrictions as to the length of cables etc.

A method is also needed through which protected signals can be transmitted to a terminating unit as a signal user allowing the signals to be transmitted at a high speed and wherein the length of the cables of the planes does not reduce the reliability.

Still further a telecommunications system is needed wherein protected (particularly high speed) signals can be transmitted to a terminating unit as user of the signal in a fast and reliable manner.

Therefore an arrangement as referred to above is provided which comprises a register arrangement in which is stored information relating to the initial delay between planes from the dynamic buffering means. Initial delay may e.g. be taken to mean the difference between read and write pointer for the static buffer of a plane after a reload operation, e.g. a first reload operation. Furthermore information is collected relating to the current delay of the first buffering means, i.e. the dynamic buffer after a (subsequent) reload operation in the first buffering means through which one plane is reloaded from another plane. The initial delay and the current delay, i.e. the difference between read and write pointers at a first occasion and at a subsequent occasion, e.g. the subsequent reload operation, are compared and via a control signal the next reload operation in the first buffering means is controlled so as to avoid end of buffer in the second buffering means, i.e. the static buffering means. If the dynamic buffer slips one clock cycle when it is restarted from another plane, e.g. a selected master plane, the static buffer for the reloaded plane will change its value in order to compensate for the change in the dynamic buffer and the current difference as referred to above is compared to the stored initial difference and a decision is taken as if to reload the dynamic buffer with an offset or not via said control signal the next time it is restarted. According to advantageous embodiments an offset can be used if the difference comprises one position or any other appropriate number of positions.

Particularly is in the register arrangement information stored relating to the position of the second buffering means at an initial start-up of the arrangement whereas the current position is given by the position of the second buffering means when a plane is reloaded from another plane in the first buffering means. Particularly the effect of the synchronization between planes in the first buffering means has on the second buffering means for a reload operation is established. The result is used to control the reloading in a subsequent reload operation. Particularly the first buffering means comprises a separate write pointer for each plane and a common read pointer which is common for all the planes.

The first buffering means moves data from a number of different clock systems, one of each plane, to a common clock system whereas the second buffering means aligns incoming data so that the frame alignment word from each of the planes is detected within one and the same clock cycle. Particularly a reload operation between planes in the first buffering means comprises copying of a write pointer of e.g. a selected master plane to a plane to be reloaded. If the delay changes, this is compensated for by the second buffering means. The copying operation may comprise copying the write pointer content of one plane to the write pointer of the plane to be reloaded with or without an offset depending on the control signal as referred to above.

Advantageously is in a register arrangement stored the initial difference between the read and write pointers of the second or static buffering arrangement of the synchronized signal and the current difference between the static inpointer and outpointer is detected when a reload operation has been done. If the current difference differs from the initial difference by a given value, e.g. a given number of positions, the dynamic write pointer of the reloaded plane is adjusted by an offset in the subsequent reload operation in the first buffering means. Particularly the difference between the initial difference or delay and the current difference or delay is a measure of the extent to which the write pointer of the second buffering means has slipped, i.e. if the number of available positions has decreased or increased in which case an adjustment is done towards the center of the buffer. Advantageously there are at least two redundant planes, i.e. at least duplication is applied. In an advantageous embodiment there are three planes which means that the signal is triplicated.

When the alignment word of a selected reference plane, e.g. a master plane, has been detected (the selection can be done in any appropriate manner), the conditions for calculating and storing the initial difference in the register arrangement are fulfilled. The register arrangement advantageously comprises an ordinary register.

An advantageous application of the invention is in the interface between a triplicated switch matrix or a cross-connect and a terminal access unit. Advantageously the write pointer in the first buffering means is reloaded using the control signal given by the delay change in the second buffering means. Advantageously the second buffering means compensates for delays introduced by the first buffering means and for static delays such as e.g. cable introduced delays etc.

Advantageously the control signal which as referred to above contains information about the previous difference and the current difference between the read and write pointers of the second buffering means and signals to logic circuit means in the first buffering means how to initiate the plane to be reloaded.

Particularly the first buffering means comprises one circular buffer for each plane.

Advantageously the second buffering means operates as a FIFO having a variable length.

Thus, in brief, the frame alignment word of a plane is detected. An external compensating loop advantageously provides for adjustment and the static buffer is set so that the frame alignment word of the master plane is in the middle of the static buffer. The other planes are adjusted so that the frame word is found within the same clock cycle when e.g. a plane is selected based on a majority selection.

In a particular embodiment means are provided for controlling the frequency of the common system clock to avoid collision between the read and write pointers of the first buffering means. Said controlling means may for example comprise a PLL (phase locked loop) with a voltage controlled oscillator (VCO).

The incoming clock systems may particularly comprise 20.48 MHz frequency clocks. For each incoming clock system there is advantageously one clock part module which modules implement the circular buffer functionality.

In a first embodiment the first and second buffering means respectively comprise separate buffering means, e.g. a dynamical buffer and a static, also denoted delay, buffer.

In an alternative embodiment the first and second buffering means comprise a common RAM.

The invention also provides a method for handling a number of protected incoming signals from a number of protection planes to a terminating unit, said method providing for handling of dynamic phase deviations between the planes and handling of static phase deviations between the planes. The first buffering means moves data from the signals of the different planes each having a clock system to a common system clock.

In second buffering means incoming data is aligned so that the frame alignment words from the different planes can be detected within the same clock cycle.

At e.g. an initial start-up of the arrangement, information is stored about the position of the read pointer in relation to the write pointer of the second buffering means after a reload operation when the signals have been synchronized into a common clock system.

When a subsequent reload operation from one plane to another is done in the first buffering means, the position of the read pointer in relation to the write pointer of the second buffering means is detected.

Then the initial position of the read pointer in relation to the write pointer is compared with the current position of the read pointer in relation to the write pointer.

If there is a difference between the initial value and the current value which exceeds a given value, e.g. if there is a difference, via a control signal the reloading of the plane is controlled the next time it is reloaded to prevent end of buffer in the second buffering means.

Advantageously a triplication protection method is used.

According to different embodiments the buffering means comprise separate buffering means formed by flip-flops or alternatively a common RAM is used forming the first and second buffering means.

A telecommunication system is also provided comprising an arrangement as disclosed above e.g. between a triplicated switch matrix and a terminal access unit.

BRIEF DESCRIPTION OF THE DRAWINGS

The invention will in the following be further described in a non-limiting way under reference to the accompanying drawings in which.

DETAILED DESCRIPTION OF THE INVENTION

Figure 1:
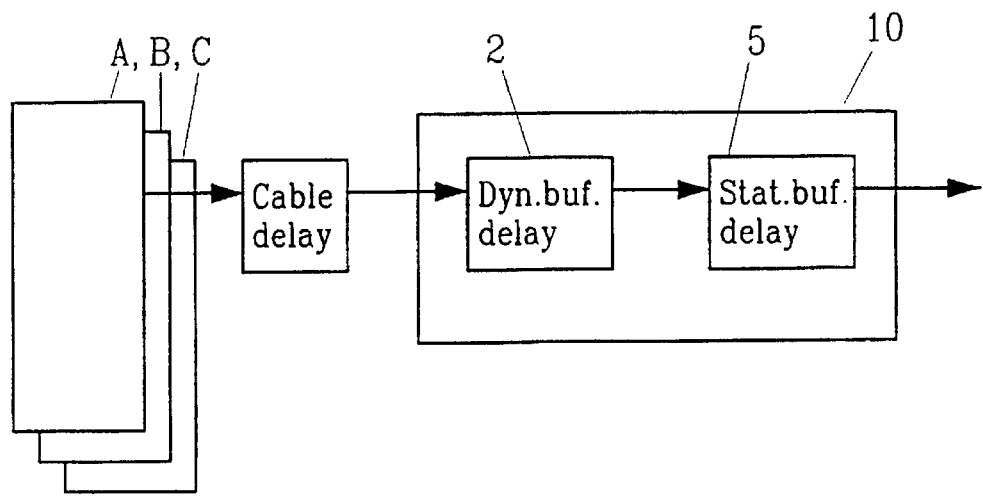
FIG. 1 illustrates a triplicated switched matrix and a buffering arrangement according to one embodiment of the invention.

FIG. 1 illustrates one embodiment of the invention wherein data is incoming to a buffering arrangement 10 from a triplicated switch matrix comprising three planes A,B,C each having its own clock system. This embodiment thus relates to the case when the number of planes is three. The invention of course also applies to embodiments wherein the number of planes is two or more than three but this will not be further discussed herein since the functioning is similar. Moreover the data processing means does not have to be a switch but it can be anything that in one way or another processes data in two or more than two planes.

The buffering arrangement 10 thus receives unsynchronized data from the three switch planes A,B,C, the data being clocked by the respective clocks of the switch planes. The buffering arrangement 10 comprises first buffering means 2 in the form of a dynamic buffer and second buffering means 5 comprising a static buffer. In FIG. 1 is illustrated the different sources of delays between e.g. the switch matrix and for example a terminating unit, or in a particular embodiment a terminal access unit of a telecommunications system as a user of the signal (the terminating unit is not illustrated in the figure). To the dynamic buffer 2 data from three different clocks are coming in from the switch or cross-connect. In the dynamic buffer 2 data from the three clocks are moved to one common system clock which will be further explained below. From the dynamic buffer 2 the data comes to the static buffer 5. In the dynamic buffer 2 the data from the three planes are bit aligned but because of different delays between the planes in the cable lengths in the switch planes and delays in the dynamic buffer 2, there are still time differences between the frames of the planes. In the static buffer 5 data incoming from the dynamic buffer 2 is aligned so that the frame alignment word from each of the three planes can be detected within one and the same clock cycle.

As will be further discussed below under reference to FIG. 5, there is an uncertainty of one clock cycle when the first buffering means 2 reloads one of its internal write pointers from e.g. a write pointer of a selected master plane. This may result in the delay through the dynamical buffer 2 changing upon reloading. The change in delay is compensated for by the static buffer 5. Depending on system, the delay may for example change at each reload operation and may then force the static buffer 5 to an end of buffer or a state in which a plane difference digression alarm, e.g. an alarm indication that end of buffer has been reached in the static buffer, is set which results in an end of buffer state for all the three planes being reached which means that the advantage of triplication vanishes or at least is considerably reduced. However, according to the invention a control signal $I_c$ is distributed from the static buffer 5 which controls how the reload operation in the dynamic buffer 2 is done. Advantageously the control signal $I_c$ controls how the write pointers of the dynamic buffer 2 are reloaded which will be further described later on. The read pointer of the static buffering means is monitored and if the positions of the static buffer are decreasing as compared to an initial position which e.g. was created at the preceding settings of the buffers, this indicates that the total delay, i.e. cable delay plus dynamic buffer delay, has changed. If then the same conditions apply as initially except for a reload, e.g. that the dynamic buffer has reloaded the write pointer, the delay has been changed in the wrong way, i.e. the static buffer has driven or slips in one and the same direction so that there after a number of reload operations will be no positions left. However, via the control signal $I_c$ the reloading in the dynamic buffer can be controlled.

Figure 2:
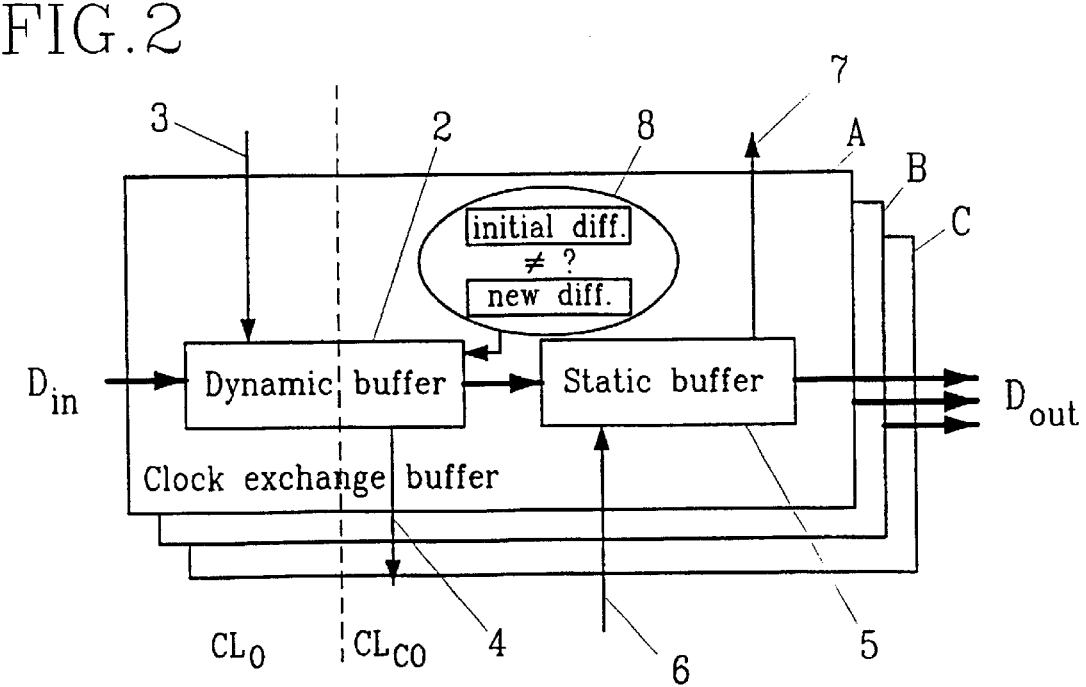
FIG. 2 illustrates a buffering arrangement according to an embodiment of the invention to which unsynchronized data is incoming.

In FIG. 2 is schematically illustrated an arrangement based on triplication as referred to above. Data with unknown phase $D_{in}$ is incoming to a dynamic buffer 2. The dashed line in the figure illustrates the conversion from the incoming clock system or the producing clock $CL_o$ to a common clock system $CL_{co}$ which as discussed above is done in the dynamic buffer 2. In the dynamic buffer 2 the data from the three planes are bit aligned. The data from the dynamic buffer 2 are received in the static buffer 5 as explained above in which the incoming data are aligned so that the frame alignment words from the three planes can be detected within one and the same clock cycle as also explained above. The difference between the static buffer read pointer 7 and the static buffer write pointer 6 is then stored in a register arrangement 8 forming what here is called the initial difference or the initial delay. Then, if a plane has been taken down for some reason it will be reloaded from one of the other planes, e.g. a selected master plane which means that the write pointer of the selected master plane will be copied to the write pointer of the plane to be reloaded. When the planes have been synchronized and when the alignment word can be detected within one and the same clock cycle the difference between the read and write pointers 6,7 of the static buffer 5 is detected. This difference is denoted the current difference or the current delay. The current difference is then compared to the initial difference stored in the registering and comparing arrangement 8 and if there is a difference, a control signal is generated. This is used for controlling the loading of the write pointer of the dynamic buffer. The dynamic write pointer may then be copied with an offset in the next reload operation. The manner in which the controlling is done, the offset and when exactly the adjustment by the offset is used can be done in different ways. Particularly if the current difference is less then the initial or preceding difference an offset is advantageously used at the next reload operation since it indicates that the read pointer is drifting which may result in end of buffer for the static buffer.

The function of the buffering arrangement comprising the first and second buffering means 2,5, will in the following be further described.

As referred to above the first buffering means advantageously comprises a dynamic buffer 2 and the second buffering means comprises a static buffer 5. The dynamic buffer 2 synchronizes the three incoming planes with the common system clock e.g. via an external PLL (phase locked loop) circuit in any appropriate way whereas the static buffer 5 also denoted the delay buffer compensates for static delays between the planes caused by differences in cable lengths etc. It will be further discussed below.

Figure 3:
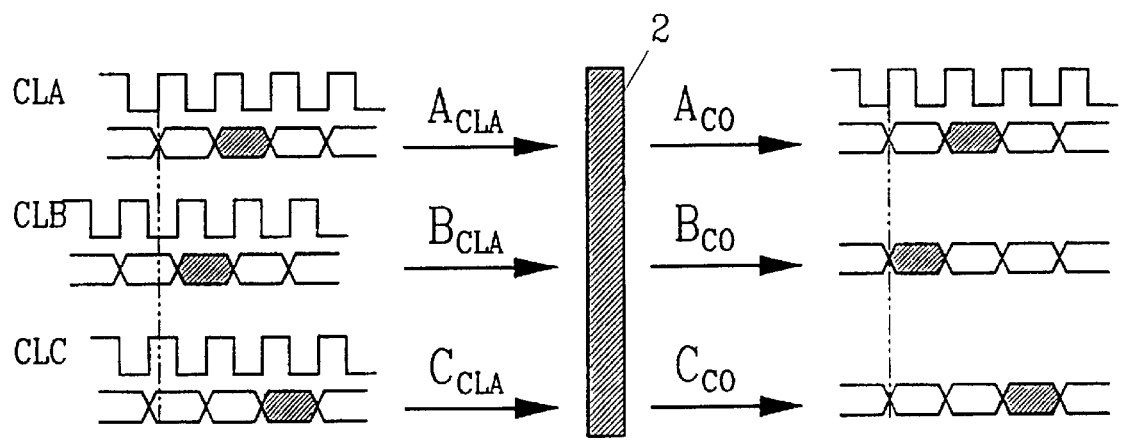
FIG. 3 illustrates the functioning of the dynamic buffering means, FIG. 4 schematically illustrates the phase difference introduced when transferring data from one clock system to another in the dynamic buffering means.
Figure 4:
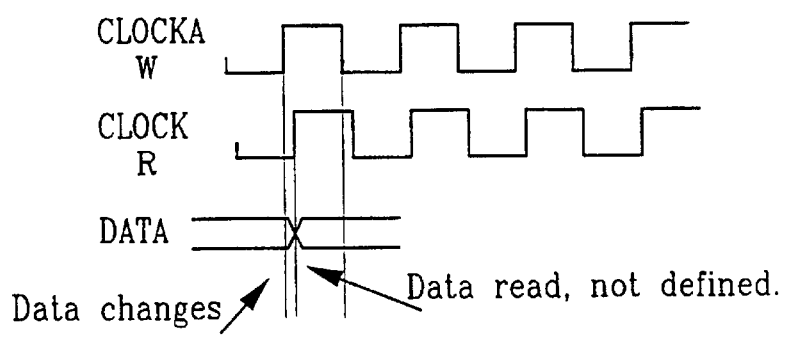

The function of the dynamic buffer 2 is schematically illustrated in FIG. 3. It handles the incoming unsynchronized data from the three planes A,B,C. The data of plane A, here denoted $A_{CLA}$, is clocked with the clock system CLA and the data of plane B, $B_{CLB}$, is clocked with the corresponding clock system CLB and finally data $C_{CLC}$ is clocked with clock system CLC. In the dynamic buffer 2 a synchronizing process takes place and results in data $A_{CLA}$, $B_{CLB}$, $C_{CLC}$ respectively clocked with the common clock system e.g. a 20.48 MHz clock system giving data $A_{co}$, $B_{co}$, $C_{co}$. However, due to phase differences between the clocks there are problems when data are transferred between different clock systems the principle of which is illustrated in FIG. 4. In the figure CLOCKA indicates the write clock system and CLOCK indicates the read clock system and if there are small momentary changes in the phase of the write clock system CLOCKA, this is handled in the circular buffer (to be further explained below) since the read and write pointers never operate on the same address. This means that if the read and the write pointers are well separated, the data will be transferred to the common clock system without any disturbance of the data. The synchronization of the three data paths A,B,C is done using three circular buffers for example nine bit wide and 8 or 16 positions deep. Each buffer has a write pointer for each plane working on the incoming clock system and one common read pointer clocked by the common system clock. In an advantageous embodiment the frequency of the common system clock is controlled by a voltage controlled oscillator VCO or in any other convenient manner which increases/decreases the frequency of the system clock depending on the filling degree of the buffers to prevent the write and read pointers from colliding.

The incoming data stream to the second buffering means 5, here the static buffer or delay buffer comes from the dynamic buffer 2 in which the data from the three planes has been bit aligned. However, due to different cable lengths and different delays from the switch planes there are still time differences between the frames of the incoming planes.

Figure 5:
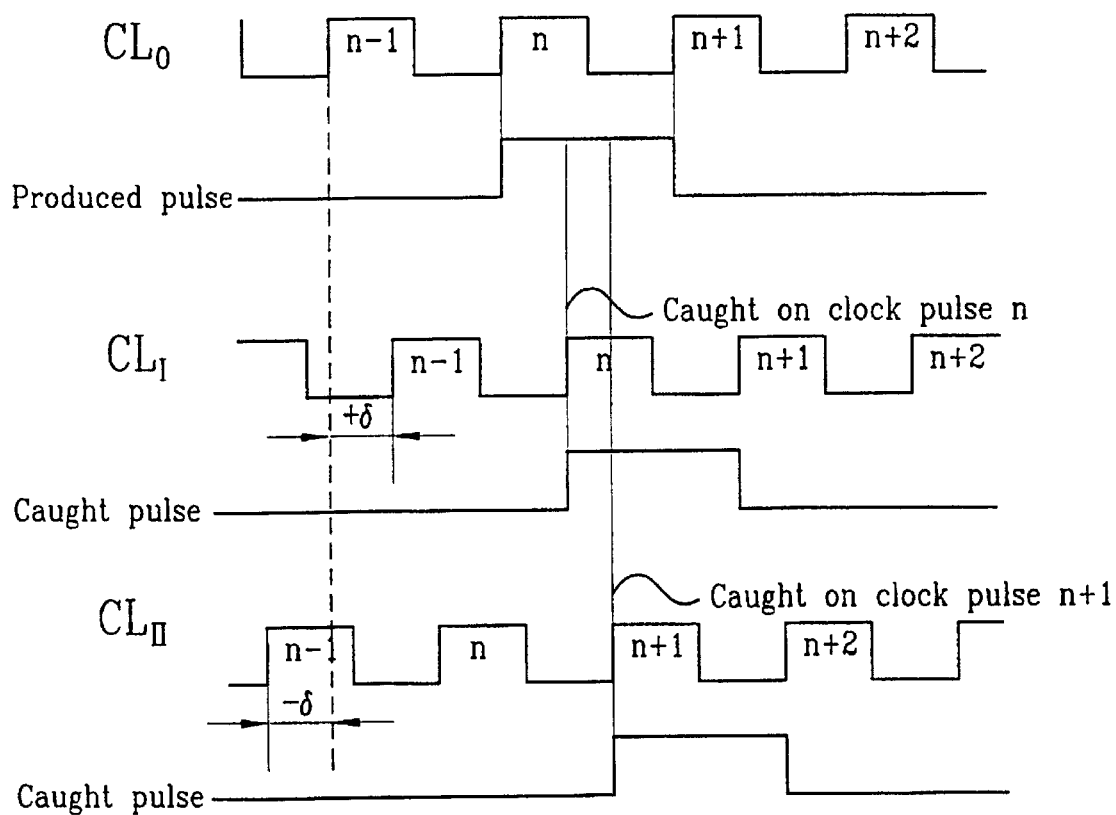
FIG. 5 illustrates for two different cases copying of pulses from one clock system to another clock system.

FIG. 5 schematically illustrates the situations when pulses are copied from a producing clock system $CL_o$ to a first catching clock system $CL_I$ and to a second catching clock system $CL_{II}$ respectively. This figure serves the purpose to illustrate the situation when e.g. the contents of a first buffering means, e.g. a dynamic buffer, for one plane such as e.g. a selected master plane, is copied to another plane or to a slave plane to restart said slave plane. The uncertainty is then one clock cycle which is illustrated by the figure. The produced pulse is indicated. Next is illustrated the case when the catching clock system $CL_I$ has a lead in relation to the producing clock system. As can be seen, the pulse is caught on clock pulse n.+δ indicates the positive phase delay.

In another case the catching clock system $CL_{II}$ has a lag and the pulse is caught on clock pulse n+1 instead. −δ denotes the negative phase delay. This illustrates how e.g. a second buffering means will be forced to one of its end positions if the plane to be reloaded from changes between the reload operations. That means that after a number of reload operations in which one plane is reloaded from another plane, the second buffering means or static buffer will arrive at end of buffer.

Since the input signal or the load signal is unsynchronized, metastability is avoided through double clocking. (If a clock generator of 2-phase type with a large non-overlapping time is used, the double clocking may not be necessary.) In the common clock system a load pulse is generated which is two clock cycles long.

Figure 6:
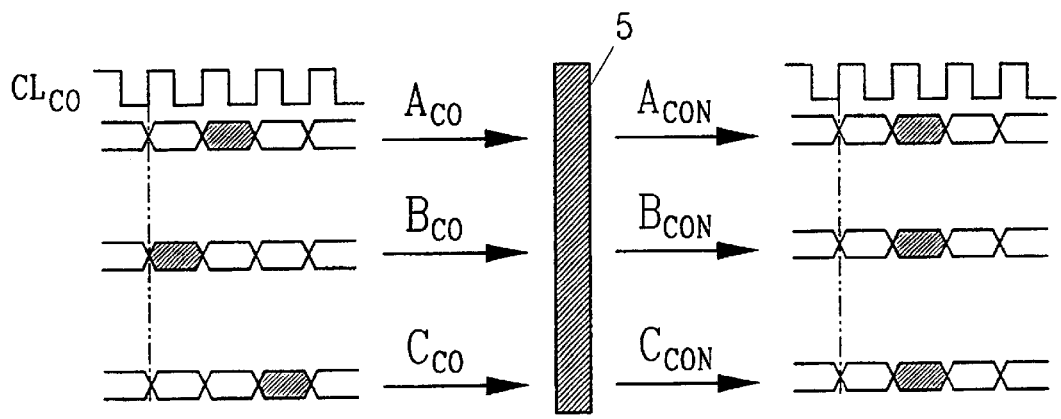
FIG. 6 illustrates the functioning of the static buffering means.

In the static buffer 5 data are aligned so that the frame alignment word from the three planes can be detected within one and the same clock cycle. This is illustrated in FIG. 6. Data A,B, and C respectively clocked with clock system $CL_{co}$, for example 20.48 MHz comes in to the static buffer 5 as discussed above and is aligned, $A_{CON}$, $B_{CON}$, $C_{CON}$ as shown in the figure. In one particular embodiment the static buffer comprises a register array e.g. 20 slots long with a bit width of 9.

Figure 7:
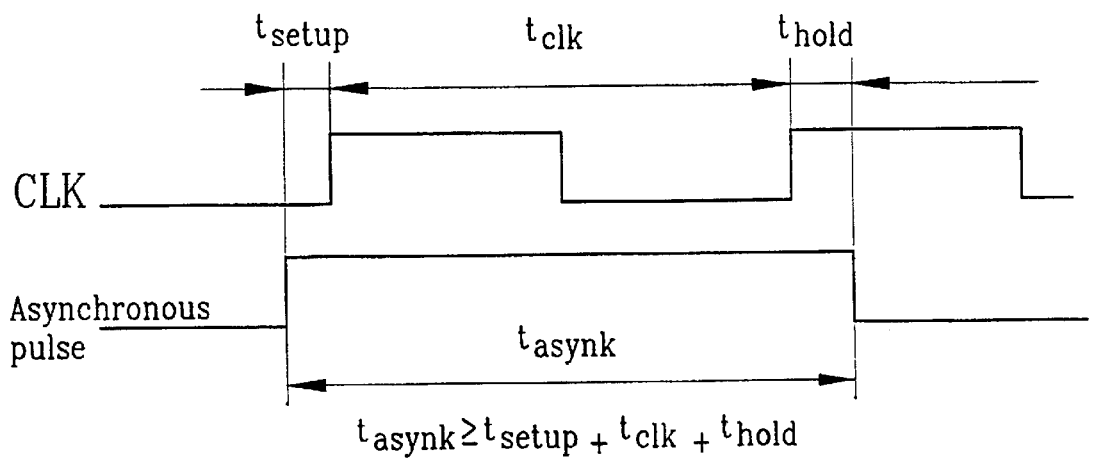
FIG. 7 illustrates the minimum duration of a load pulse provided to the first buffering means.

In FIG. 7 the theoretical minimum duration of an incoming asynchronous pulses illustrated. $T_{async}$ illustrates the minimum duration of the asynchronous pulse which comprises a set-up time, clock time and a hold time. The pulse then passes two registers which are clocked with the incoming plane clock. Since the load pulse is two cycles long, the asynchronous clock system will not miss the pulse. The detected load pulse in the new clock system can be one or two pulses long but e.g. through the use of a state machine a pulse can be generated which is only one clock cycle long (which pulse resets a write address counter counting the write addresses).

Figure 8:
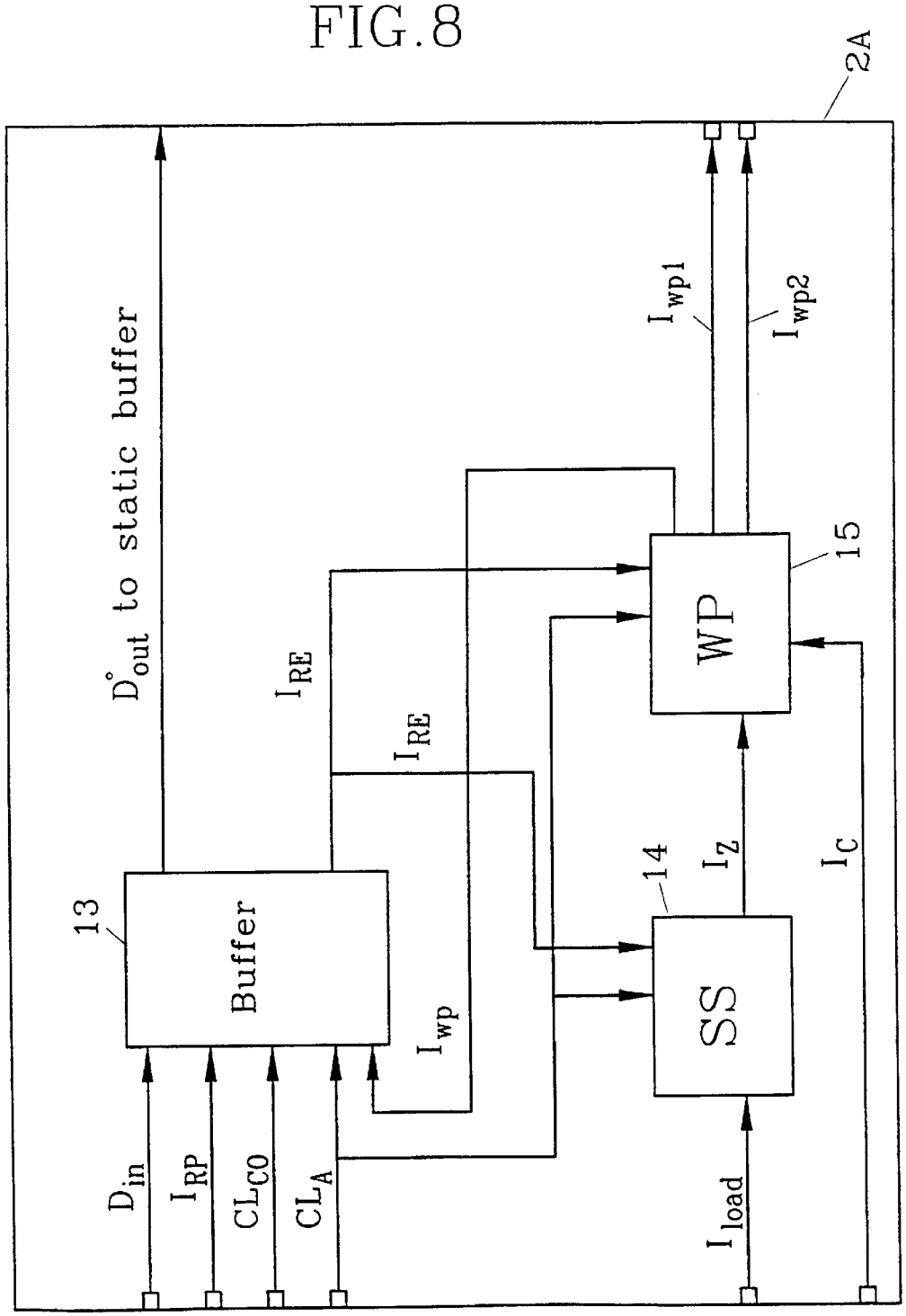
FIG. 8 illustrates a clock part module of the dynamic buffer implementing the circular buffer function of a corresponding plane.

For each incoming clock system, i.e. the clock system of the respective planes A,B,C there is a clock part module which implements the circular buffer function as referred to above. The clock part module of the plane comprises three submodules as illustrated in FIG. 8. One of the modules 2A comprises an asynchronous interface 14 (SS) which receives an asynchronous reset pulse which defines an initial start of the write pointer module 15 (WP) which comprises a block pointing out the position in the circular buffer 13 which will contain the next coming valid data in the input pay-load stream. The asynchronous interface 14 handles the metastability between the two clock systems as referred to above. In the 20,48 MHz common clock system a load pulse is generated which is two clock cycles long. The pulse passes to a register which is clocked with the incoming plane clock as can be seen from FIG. 8. Since the load pulse $I_{load}$ is two cycles long, the other clock system will not miss the load pulse. However, the detected load pulse in the other clock system could as referred to above be one or two pulses long. However, the block 14 operates as a state machine which generates a pulse $I_z$ which is only one clock cycle long. As signal $I_z$ is input to the WP module 15 which as referred to above points out the position in the circular buffer which will contain the next coming valid data in the input stream which is done by a counter generating a three bit address.

The buffer 13 receives a signal $D_{in}$, i.e. a data input signal (e.g. 9 bits) from the dynamic buffer 2. As referred to in the foregoing there are three differently clocked data streams input to the dynamic buffer. The output comprises three datastreams clocked by the common clock.

Input to the buffer 13 is also the clock signal $CL_{co}$ which is common for the read pointers (via PLL). The input read pointer signal is denoted $I_{RP}$. There is one clock system for each write pointer, here is the A-plane clock signal $CL_A$ illustrated. $CL_A$ is also input to the asynchronous interface 14 and the write pointer module 15.

$I_{RE}$ is a signal relating to restart if there has been a clock error, either automatically, or ordered. This however only relates to advantageous embodiments and it is not necessary for the functioning of the present invention.

The WP block 15 generates two signals of which $I_{wp1}$ is a control signal that is generated to create a pulse width modulated signal controlling the PLL. The signal $I_{wp2}$ indicates the zero pass of the counter. The signal is however not high at zero of the counter because it will be delayed two clock cycles in the block 14 for the plane which is to be loaded. WP comprises the address positions in the circular buffer. WP block 15 may of course also generate other signals which however are not necessary for the functioning of the present invention. $D°_{out}$ is a signal provided among others to the static buffer 5. The frame word position of the signal is provided to the external signal input to the control logic 53 of the static buffer.

The WP block 15 can be switched between two load settings depending on the control signal $I_c$ which is decoded in the static buffer block. The WP block 15 then chooses the most probably state for the next state.

Figure 9:
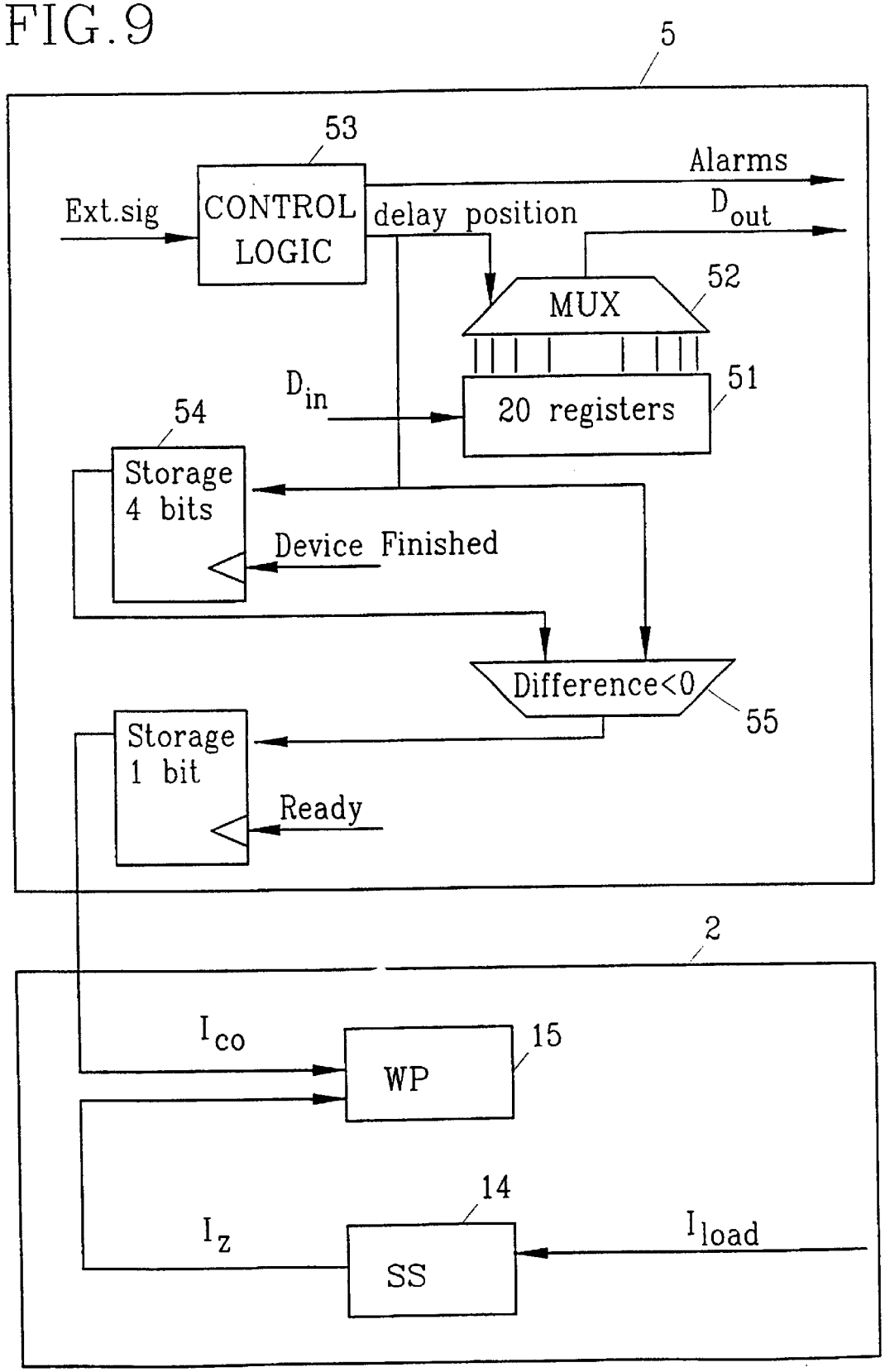
FIG. 9 is a functional block diagram illustrating the first and second buffering means of a particular embodiment.

The static buffer 5 works as a FIFO with a variable length (see FIG. 9). The data is input to the register array 51 and a multiplexer 52 connects the block output to one of the outputs of the registers 51. The data sent to the output is then passed through a register. The length of the FIFO is controlled by the control logic 53. The LFA, Loss of Frame Alignment plane i, i (not shown) here denoting anyone of planes A,B,C, signal resets the buffer 5 to a delay of ten cycles which means that the data is shifted through ten registers before piped to the block out-put. An external signal comprising the common system clock is used to increase or decrease the delay with one clock cycle per frame. This increasing or decreasing procedure takes place in the middle of the frame (at the time of a measure pointer). If the desired delay exceeds the length of the FIFO, i.e. here ten in each direction, the control logic 53 will set a plane difference digression alarm.

In the comparing means 55 is detected the slipping from the preceding value and the difference denotes the current position minus the stored position. Device finished is an external control signal indicating when to write in the memory, i.e. that the adjustment is finished and the delay of the FIFO after synchronization with the other planes. Then the delay position is stored. The delay is stored on storage 54. The compensation procedure in the static buffer starts when one plane has been frame aligned which can be done using a reference plane in a manner known per se. A signal is provided when the planes are ready. When thus the compensation has been done and a plane is ready, the current difference (delay) is stored. If at a subsequent reloading of a plane, a new compensation is needed, the current delay at that point is compared with the initial delay. The reset position of the write pointer of the dynamic buffer 2 is controlled by the control signal $I_{co}$. If thus the initial difference differs from the current difference, the control signal $I_{co}$ is activated and if the initial delay is lower than the current delay, or if there has been no change, the control signal $I_{co}$ is kept inactive.

In FIG. 9 is also illustrated when the load signal is provided to the SS 14 whereafter one pulse which is only one clock cycle long is generated which resets the write address counter as discussed above. The write pulse WP indicates the position of the buffer which is then controlled by the control signal $I_{co}$ as discussed above. The control signal $I_{co}$ thus keeps information about the position of the read pointer of the static buffer at the preceding compensation as compared to the initial position at a previous occasion or the first time system was started which here means at device finished. Thus the control signal $I_{co}$ signals to the logic of the dynamic buffer 2 the effects on the static buffer position resulting from the last reload of the write pointer of the concerned plane of the dynamic buffer 2. This means that the dynamic buffer is informed about in which direction the static buffer has more margins to take an uncertainty in delay difference the next time a reload is done in the dynamic buffer for the same plane. The position is advantageously observed via observation of the static buffer read and write pointers as already mentioned.

$I_{co}$ thus controls the write pointers upon reload and indicates the address to be used for writing the next time so that the buffer of the concerned write pointer will be synchronized with the buffers of the other write pointers, i.e. the other planes. As discussed above the asynchronous interface 14 converts the $I_{load}$ signal if it comprises two (or more) clock cycles to one clock cycle.

In an alternative embodiment instead of separate dynamic and static buffers a combined dynamic and static (delay) data buffer is used. The dynamic buffer part thereof synchronizes the incoming planes, in a particular embodiment three planes, with the common system clock via an external PLL circuit in a manner known per se. The static buffer compensates for static delays between the planes caused by differences in cable lengths etc. as discussed above. The arrangement of this embodiment functions in the same manner as the one described above with the difference that the buffers are implemented as comprising a common RAM. The delay buffers or RAM areas are e.g. 48 or 24 clock cycles depending on which buffer length is chosen and have a bit width of nine in an advantageous embodiment. The invention is however of course not limited thereto. Also here the delayed buffer works as a FIFO with variable length. The RAM area read pointer is controlled by the control logic. The RAM may be a dual port type RAM. Also in this embodiment the static buffer is used for compensation. The offset adjustment provided by the control signal if needed is illustrated in FIG. 10.

The invention is of course not limited to the shown embodiments but can be varied in a number of ways within the scope of the claims.

What is claimed is:

1. A buffering arrangement (10) receiving redundant signals intended for a terminating unit as signal user, said signals comprising a number of unsynchronized datastreams from a number of different planes (A, B, C) with each a clock-system (CLA, CLB, CLC), said arrangement comprising first buffering means (2) for handling dynamic phase deviation between the planes (A, B, C) and second buffering means (5) for handling static phase deviations between the planes (A, B, C), characterized in, that a register arrangement (8;54) is provided in which is stored information relating to an initial difference between read and write pointer for a plane in the second buffering means (5), and in that further information relating to the current difference between the read and write pointer of the same plane in the second buffering means (5) is stored after a reload operation and in that the initial difference and the current difference are compared providing a control signal ($I_{CO}$) which is used for the next reload operation of the same plane in the first buffering means (2) which is controlled by said control signal ($I_{CO}$) to avoid end of buffer in the second buffering means (5) if the difference between the initial and the current differences exceeds a given number of positions.

2. A buffering arrangement according to claim 1, characterized in, that if the difference between the initial and current difference is one position, the next reload operation of the plane is adjusted by an offset given by the control signal ($I_{CO}$).

3. Arrangement according to claim 1, characterized in, that in the register arrangement (54) is stored information relating to the position of the second buffering means (5) at an initial start-up of the arrangement and in that the current delay is given by the position of the second buffering means (5) when one plane has been reloaded from another plane in the first buffering means (2).

4. Arrangement according to claim 1, characterized in, that the effect of synchronization between planes in the first buffering means (2) on the second buffering means (5) from a reload operation is established and used to control the reloading in the subsequent reload operation of the same plane in the first buffering means (2).

5. Arrangement according to claim 1, characterized in, that the first buffering means (2) comprises a separate write pointer for each plane and a common read pointer ($I_{RP}$) which is common for the planes (A,B,C), the first buffering means (2) moving data from planes of different clock systems (CLA,CLB,CLC) to a common clock system ($CL_{CO}$) and in that the second buffering means (5) aligns incoming data so that the frame alignment words from each of the planes are detected within one clock cycle.

6. Arrangement according to claim 5, characterized in, that a reload operation between planes in the first buffering means (2) comprises copying of a write pointer of a selected plane to a plane to be reloaded and in that if the difference changes from one reload operation to another, this is compensated for in the next reload operation.

7. Arrangement according to claim 4, characterized in, that the copying operation comprises copying the write pointer content of one selected plane to the write pointer of the plane to be reloaded from said selected plane with or without an offset.

8. Arrangement according to claim 1, characterized in, that in the register arrangement (54) is stored the initial difference upon device finished between the read and write pointers of the second or static buffering arrangement (5) of the synchronized signal and the current difference between the static inpointer and outpointer is detected when a reload operation is done and in that if the initial difference differs from the current difference by at least one position, the dynamic write pointer of the reloaded plane is adjusted by an offset in the subsequent reload operation in the first buffering means (2).

9. Arrangement according to claim 1, characterized in, that the number of planes are at least two.

10. Arrangement according to claim 9, characterized in, that the number of planes are three.

11. Arrangement according to claim 1, characterized in, that when an alignment word of a selected reference plane has been detected the initial difference between read and write pointers of a plane not being the reference plane is stored in the register arrangement (54).

12. Arrangement according to claim 10, characterized in, that it is comprised in a switch interface between a triplicated switch matrix and a terminal access unit.

13. Arrangement according to claim 1, characterized in, that the second buffering means (5) compensated for delays introduced by the first buffering means and for static delays.

14. Arrangement according to claim 1, characterized in, that the control signal ($I_C$) signals to logic circuit means in the first buffering means (2) the effect on the second buffering means (5) resulting from the preceding reload operation.

15. Arrangement according to claim 1, characterized in, that the first buffering (2) means comprises one circular buffer for each plane.

16. Arrangement according to claim 15, characterized in, that the circular buffer functionality for a plane is implemented by a clock part for that plane and in that there is one clock part for each plane.

17. Arrangement according to claim 1, characterized in, that means are provided for controlling the frequency of the common system ($CL_{co}$) clock to avoid collision between the read and write pointers of the first buffering means (2).

18. Arrangement according to claim 17, characterized in, that the controlling means comprises a phase locked loop (PLL) with a voltage controlled oscillator.

19. Arrangement according to claim 1, characterized in, that the incoming clock systems comprise 20.48 MHz clocks.

20. Arrangement according to claim 1, characterized in, that the buffering means (10) comprises a separate dynamical buffer (2).

21. Arrangement according to claim 20, characterized in, that the second buffering means (5) comprises separate buffering means arranged so as to receive data clocked by the common system clock ($CL_{co}$) from the first buffering means (2).

22. Arrangement according to claim 1, characterized in, that the first and second buffering means (2,5) are implemented through a common RAM.

23. Telecommunications system comprising a number of protected switching arrangements wherein buffering arrangements (10) are arranged which receive redundant signals intended for a terminating unit, the signals further comprising unsynchronized datastreams from a number of different planes (A, B, C), said buffering arrangements (10) each comprising first and second buffering means (2;5) for handling dynamic and static phase deviations respectively, characterized in,
that each buffering arrangement (10) comprises a register arrangement (8;54) in which is stored information about the initial difference between the read and write pointer positions for a plane in the second buffering means (5) and in that if after a subsequent reload operation of said plane, the difference has changed at least by a given amount, the write pointer of the first buffering means (2) is reloaded with an offset in the next reload operation.

24. Method in a communications system for handling dynamic and static phase deviations between signals from at least two redundant planes comprising the steps of:
handling dynamic phase deviations between planes in first buffering means (2),
handling static phase deviations between planes in second buffering means (5), characterized in,
that it further comprises the steps of:
monitoring if a delay in the second buffering means (5) changes from one reload operation of a plane to the subsequent reload operation of said plane, if the change exceeds a given value, said plane is reloaded with an offset the next time.

25. Method according to claim 24, characterized in, that the delay is monitored through detection of the number of available positions in the second buffering means (5), and if the number decreases from one reload operation to another, a control signal ($I_{co}$) is provided which controls the next reload operation in the first buffering means (2) of said plane.

26. Method for handling dynamic and static phase deviations between signals from at least two redundant planes (A, B, C), said method comprising the steps of:

handling dynamic phase deviations between the planes in first buffering means (2), handling static phase deviations between the planes in second buffering means (5), characterized in, that it further comprises the steps of:

storing initial information about the difference between the read and write pointers for a plane of the second buffering (5) means in a register arrangement (8;54), when said plane has been subsequently reloaded, storing the current difference between the static read and write pointers of that plane, comparing the initial difference with the current difference, if the result of the comparison is that the difference between read and write pointers has changed by at least a given value, reloading the dynamic write pointer of said plane with an offset in the next reload operation in the first buffering means (2).

27. Method according to claim 26, characterized in, that the offset is given by the result of the comparison and in that a control signal $(I_{co})$ is provided which controls the next reload operation.

\* \* \* \* \*